(12) United States Patent
Kazda et al.

(10) Patent No.: US 10,606,976 B2
(45) Date of Patent: Mar. 31, 2020

(54) ENGINEERING CHANGE ORDER AWARE GLOBAL ROUTING

(71) Applicant: International Business Machines Corporation, Armonk, NY (US)

(72) Inventors: Michael A Kazda, Poughkeepsie, NY (US); Diwesh Pandey, Bangalore (IN); Sven Peyer, Tuebingen (DE); Gustavo E Tellez, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 15/477,549

(22) Filed: Apr. 3, 2017

(65) Prior Publication Data

US 2018/0285507 A1   Oct. 4, 2018

(51) Int. Cl.
  *G06F 17/50*      (2006.01)
  *H03K 19/17736*   (2020.01)
  *H03K 19/17752*   (2020.01)
  *H03K 19/17756*   (2020.01)

(52) U.S. Cl.
  CPC ...... *G06F 17/5077* (2013.01); *G06F 17/5045* (2013.01); *G06F 17/5072* (2013.01); *G06F 17/5081* (2013.01); *H03K 19/1774* (2013.01); *H03K 19/17752* (2013.01); *H03K 19/17756* (2013.01); *G06F 2217/84* (2013.01)

(58) Field of Classification Search
  CPC ............. G06F 17/5077; G06F 17/5081; G06F 17/5072; G06F 17/5045; H03K 19/17756; H03K 19/17752; H03K 19/1774
  See application file for complete search history.

(56) References Cited

U.S. PATENT DOCUMENTS

| | | | |
|---|---|---|---|
| 7,877,721 B2 | 1/2011 | Schleicher, II et al. | |
| 8,015,522 B2 | 9/2011 | Wang et al. | |
| 8,966,425 B1 | 2/2015 | Eisenstadt et al. | |
| 9,165,103 B1* | 10/2015 | Salowe | G06F 17/5077 |
| 10,192,859 B2 | 1/2019 | Aton et al. | |
| 10,204,895 B2 | 2/2019 | Pincu et al. | |
| 2013/0326458 A1* | 12/2013 | Kazda | G06F 17/5077 |
| | | | 716/129 |

OTHER PUBLICATIONS

J-H Hung et al. "Eco-Aware Obstacle-Avoiding Routing Tree Algorithm", WSEAS Trans on Circuits and Systems, Issue 9, vol., Sep. 2010, pp. 567-576.
J. Chuang., "Signoff-Driven Timing Closure ECO in the Synopsys Galaxy Platform," Synopsys White Paper, Feb. 2014.

* cited by examiner

*Primary Examiner* — Nha T Nguyen
(74) *Attorney, Agent, or Firm* — Jeffrey S LaBaw; Steven J Meyers (57) ABSTRACT

A router is used to produce a first integrated circuit structure according to an engineering change order. An initial detail routing topology is imported for the first integrated circuit structure. An engineering change order is received instructing the router to change a portion of the initial detail routing topology for the first integrated circuit structure. A global routing operation is performed which routes global wires for the portion of the initial detail routing topology for the first integrated circuit structure. For each global wire which is routed, a specific global wiring track is selected for the global wire within each edge of a set of global tiles in a routing topology for the first integrated circuit.

20 Claims, 10 Drawing Sheets

ENGINEERING CHANGE ORDER AWARE GLOBAL ROUTING

BACKGROUND OF THE INVENTION

This disclosure relates to integrated circuit devices. More specifically, to designing interconnect wiring structures in semiconductor devices.

Integrated circuits are fashioned by creating a plurality of devices in a substrate which are interconnected by multiple layers of interconnections. The process starts with a chip designer constructing the layout of a new chip design with the use of an electronic design automation (EDA) system. One of the tasks automated by such tools is the wire routing, or simply routing, of the wiring or nets between devices on the integrated circuit layout within the available space allocated to the metal layers and the vias which interconnect the metal layers. Speed in the design process is an important criterion for an EDA system. Design tools which provide rapid, accurate results, especially for large complex designs are valuable so that designers can make decisions quickly on design tradeoffs without needing to wait for days to even weeks to obtain accurate results from the system.

Global routing in modern circuit design is used to establish an approximate route of the wiring between devices. Detail routing follows the global routing and determines the precise paths for the nets. The global routing is simpler than the detail routing problem, because it does not see many of the small details that detail routing has to solve. Therefore, it has several advantages including that global routing is much faster than detail routing. Further, global routing can be designed in such a way that its results are "provably optimal", in other words, it has some quality guarantees. Global routing is used as guidance for detail routing, e.g., used for wire resource allocation and fast estimation purposes.

In detail routing, the router embeds wires onto the chip area according to the global routing guidance. Only if a feasible solution cannot be found, a rip-up and reroute approach is taken to make up space in order to close the open connection. It is desirable that the global routing be as accurate as possible to minimize computations needed in the rip-up and reroute step. One of the reasons for additional detail routing once the initial chip design is complete is an engineering change order (ECO). Engineering change orders are common when the designers are evaluating design trade-offs. Unfortunately, current global routing models are weak in anticipating the problems caused by subsequent ECO detail routing. By its nature, the global routing is coarse and does not see the details involved in an engineering change order. This leads to an undesirably high amount of rip-up and reroute in the detail ECO routing which causes a high runtime cost. Furthermore, during global routing, there is a poor selection of bystanders. A "bystander" is a wiring net which is selected for rip-up to accommodate the global wire route.

The present disclosure presents an advanced electronic design mechanism to alleviate these problems.

BRIEF SUMMARY

According to this disclosure, a router is used to produce a first integrated circuit structure according to an engineering change order. An initial detail routing topology is imported for the first integrated circuit structure. An engineering change order is received instructing the router to change a portion of the initial detail routing topology for the first integrated circuit structure. A global routing operation is performed which routes global wires for the portion of the initial detail routing topology for the first integrated circuit structure. For each global wire which is routed, a specific global wiring track is selected for the global wire within each edge of a set of global tiles in a routing topology for the first integrated circuit.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings which are not necessarily drawing to scale, and in which.

DETAILED DESCRIPTION OF THE DRAWINGS

At a high level, embodiments of the invention provide an "ECO aware" global router. By "ECO aware", the inventors mean that the global router is designed in view of the difficulties in an engineering change order phase of the routing process. In comparison to the prior art, most of the changes implemented by the inventors take place in the global routing phase. Among the advantages of embodiments of the invention is to model global wires more accurately and to retain some of the efficiency of the global routing model in response to an ECO. In embodiments of the invention, every track in the edges of the global tile is modelled individually. The global router must choose a track for the global wires for every edge representing wire capacity or via capacity between global tiles. The global router is "penalized" when the global router switches tracks or chooses a used track. The criticality of respective nets or wires is determined in embodiments of the invention, so that more critical nets can be treated preferentially as compared to less critical nets.

Embodiments will be explained below with reference to the accompanying drawings.

Figure 1:
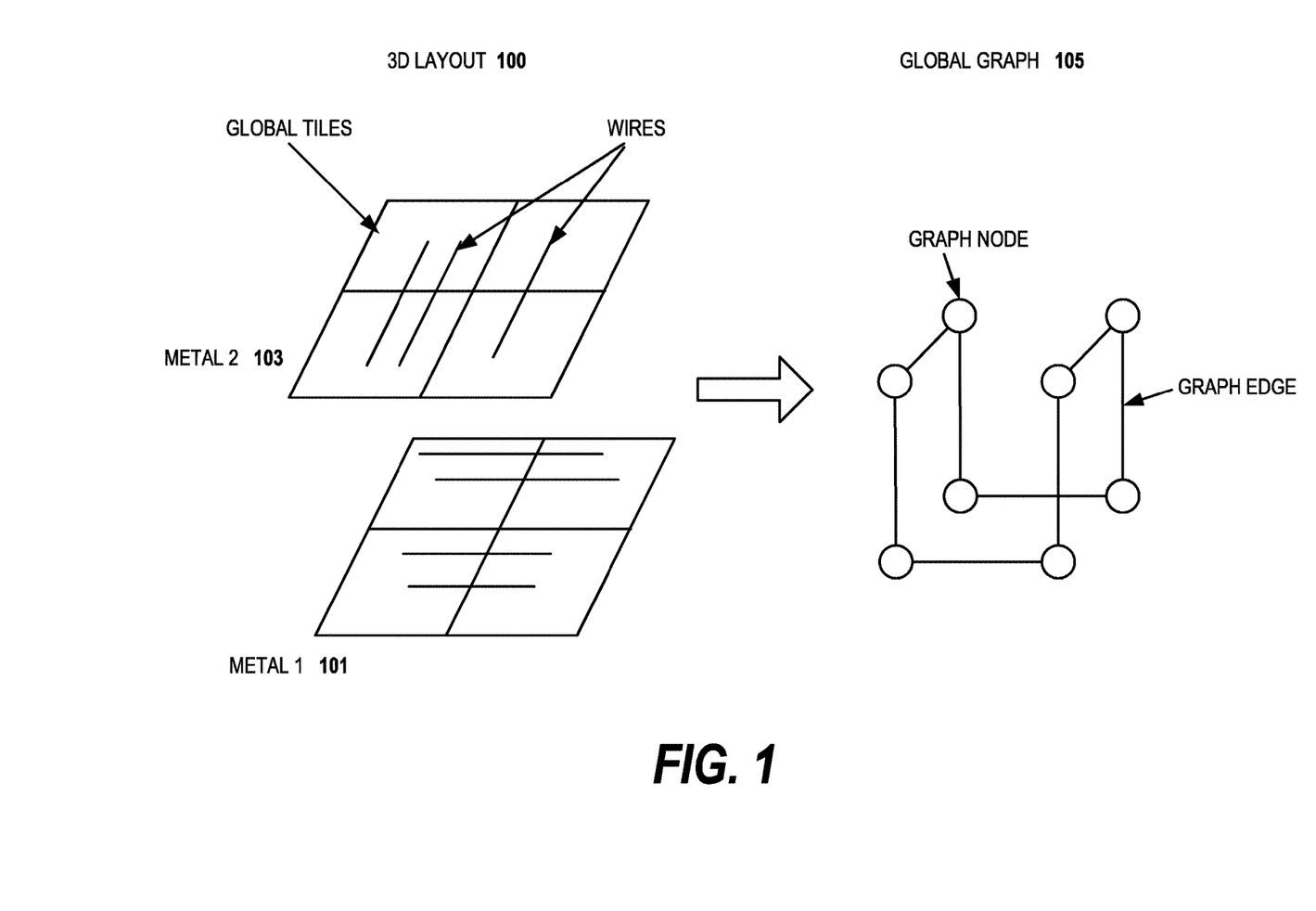
FIG. 1 is a diagram depicting two sets of global tiles in a circuit design disposed on a substrate and a global graph of the circuit design where each global tile is represented by a graph node and the wiring capacity between nodes is represented by an edge between nodes according to a first embodiment of the invention.

FIG. 1 is a diagram depicting two sets of global tiles in a circuit design disposed on a substrate and a global graph of the circuit design where each global tile is represented by a graph node and the wiring capacity between nodes is represented by an edge between nodes according to a first embodiment of the invention. On the left side of the drawing, a 3D layout 100 is shown which includes a first level metal 101 design is divided into a set of four global tiles which describe the wiring tracks in the respective areas of the chip. A second level metal 103 design is also shown divided into four global tiles.

The left side of the drawing is a simplified representation of detail wires running from one global routing tile to a neighboring global routing tile. On the right side of the drawing, a global graph 105 which consists of nodes and edges is shown. The right side of the drawing is a dual graph of the tile-based representation where each tile is represented by a node and two adjacent tiles are connected by an edge. The global router has a single representation of wiring. The routing graph is a representation of the routing space. The representation has nodes, which represent where the wires connect, and edges, which represent how many wires can go from one node to the next. Each node corresponds to a global tile in the left hand side of the drawing and represents a coordinate on a metal layer. An edge, which is sometimes called an arc, corresponds to the wiring which connects two neighboring global tiles. A vertical edge corresponds to an up/down connection (i.e. a via) and is assigned the capacity of the vias which can run between two of the global tiles in different metal layers. A horizontal edge corresponds to the connections which run within the metal layer and is assigned the capacity of the wires which travel from one global tile to another within the metal layer.

Thus, the collection of wires routed by the global router is represented by the edge traveling from node to node. Each new wire assigned to a given edge adds demand to the edge. When the demand along an edge exceeds capacity of the edge, there is an "overflow" and all of the demands cannot be met. In most routers, it is assumed that if there are no overflows on an edge, the global routing can be detail routed, however, but the inventors know this is not always true. "Hidden" capacity problems are revealed during detail routing, especially in ECO routing.

As an input to the ECO routing, there is a completed routing of the initial chip design. In other words, in the initial design, the routing space is full, or nearly full, with pre-existing wires. An ECO (Engineering Change Order) adds or removes some circuits, and therefore, adds or removes some connections. The ECO routing problem is to complete those connections with new wiring, while disturbing the pre-existing wires that are not involved in the ECO as little as possible. This later requirement makes the ECO detail routing often much harder to complete than the initial design.

Figure 2:
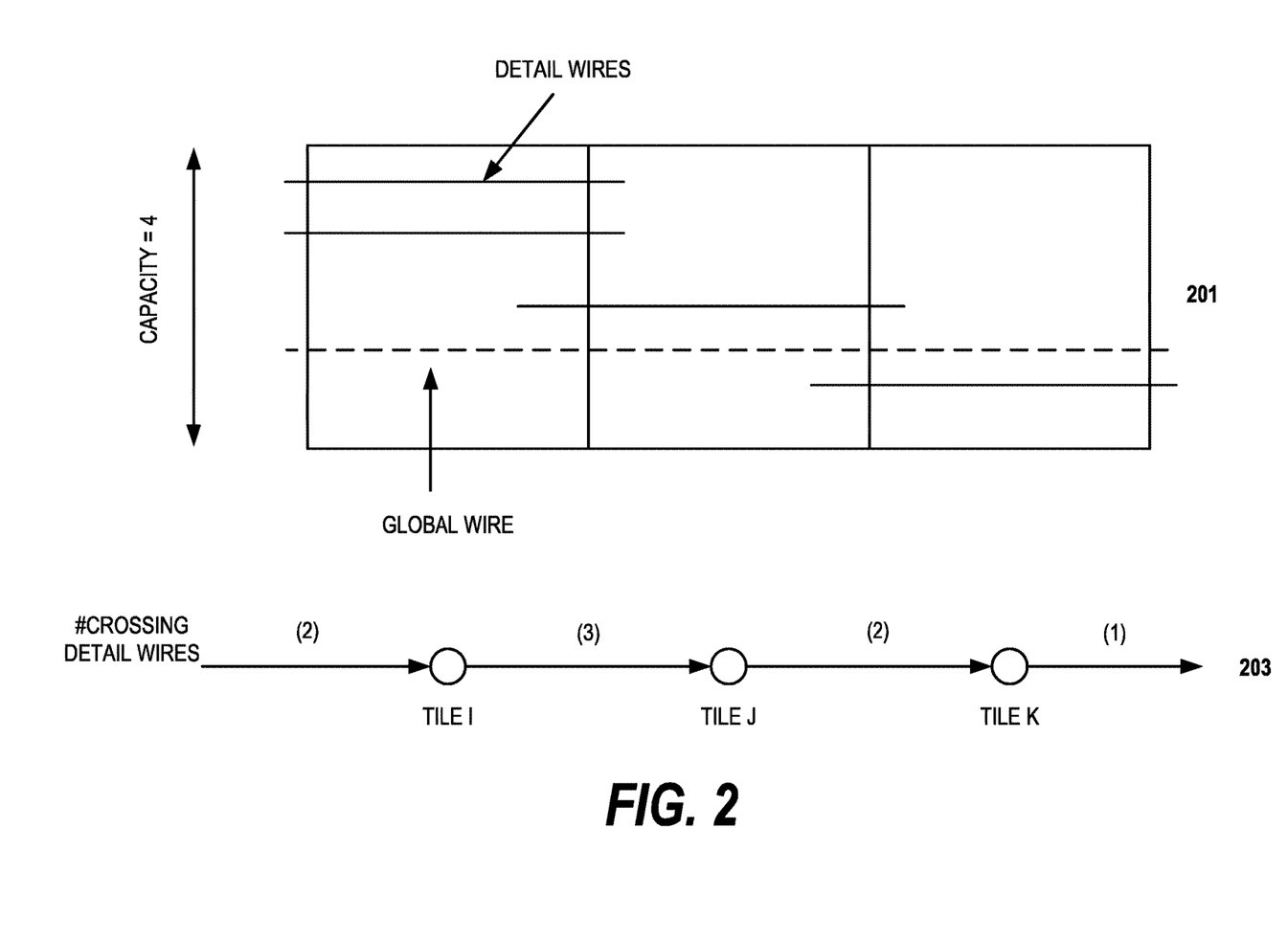
FIG. 2 is a diagram depicting three adjacent global tiles in a circuit design showing the wiring tracks which are common between the three global tiles showing a capacity problem according to a first embodiment of the invention.

FIG. 2 is a diagram depicting three adjacent global tiles 201 in a circuit design showing the wiring tracks which are common between the three global tiles showing a capacity problem where the global model breakdown. Beneath the three global tiles is a representation of the number of crossing detail wires 203. As shown, two detail wires cross the boundary between the first global tile, global tile I, and an adjacent global tile (not shown) on tracks one and two. Three detail wires cross between the global tiles I and J (on tracks 1, 2, 3), two detail wires cross between the global tiles J and K (on tracks 3 and 4) and one detail wire crosses between the third global tile, global tile K, and an adjacent global tile (not shown) on track four. In this example, assume that there is a wire capacity of four tracks along each edge and that the global router needs to route a global wire across the set of global tiles. Based on the capacity at each edge, there is enough capacity on all the edges for an additional wire, however, there is no common track where the global wire can be placed without a short. Nonetheless, in the prior art, the global router will assume that there is sufficient capacity and route the global wire. Then, during the detail wiring phase, there will be unnecessary rip-up and rerouting.

Figure 3A:
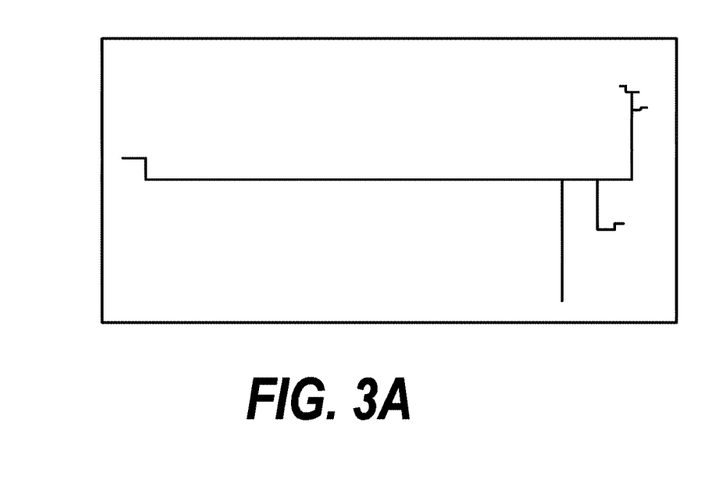
FIG. 3A is an overview diagram depicting a global routing topology showing the wiring design after global routing.

FIG. 3A is an overview diagram depicting a global routing topology showing the global wiring design after global routing. As can be seen, the global router designs the global wires to be as straight and short as possible as chip performance is optimized by wiring having these characteristics. A minimum amount of track switching is contemplated.

Figure 3B:
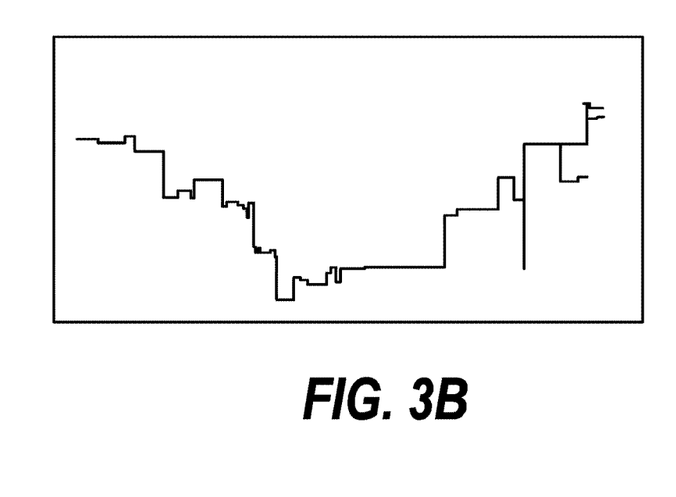
FIG. 3B is an overview diagram depicting a routing topology showing the wiring design after detail routing.

FIG. 3B is an overview diagram depicting a routing topology showing the global wiring design after detail routing. Despite the performance gains with short, straight wires, the final routing of the detail wires rarely follows the optimal straight and short design of the global wire. As shown in this drawing, there is quite a bit of track switching as the detail wires meander over the wiring layer. These changes were needed during the detail routing phase as the global router did not accommodate the needs of the detail routing phase.

The present invention provides an ECO routing aware model for the global router. As shown in the flow diagram in FIG. 4, the routing process begins with an initial global routing phase 401 in which the coarse wiring design from the initial design is laid out. This is followed by an initial detail routing phase 403 in which the coarse wiring from the global wiring step is changed to more precisely wire the devices together. Next, in the logic ECO phase 405, a design change to the initial design is requested, i.e. an ECO. The ECO global routing phase 407 takes account of the existing wires created during steps 401 and 403 to layout the coarse wiring according to the global routing rules. In the invention, the global routing operation routes global wires for a portion of the initial detail routing topology for the first integrated circuit structure affected by the ECO. The portion is not necessarily all the detail wires within a certain area of the integrated circuit, but can include only the missing segments in the route topology. The ECO global routing portion can include detail wires which are no longer routed, i.e. by virtue of being in a rip-up bucket after being displaced by the wires needed for the ECO. This is followed by an ECO detail routing phase 409 which creates the detailed wiring in response to the ECO taking in account the "existing" wires.

Figure 4:
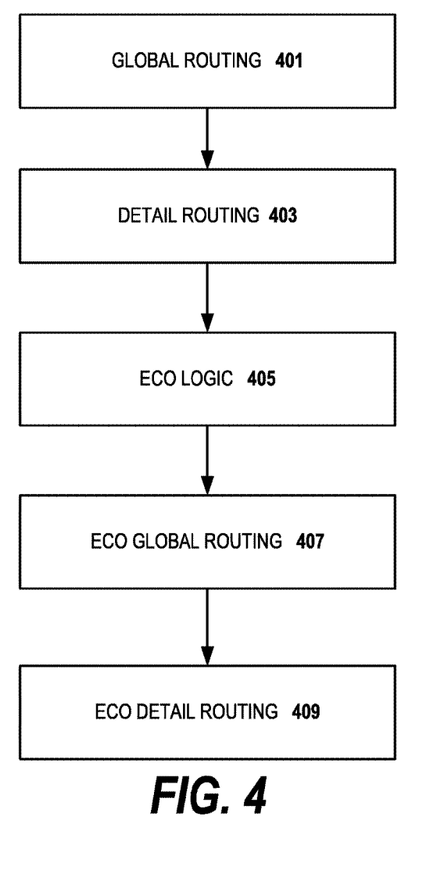
FIG. 4 is a flow diagram of the high level routing process according to a first embodiment of the invention.

Thus, as illustrated in the drawing, in preferred embodiments, ECO routing is broken into ECO global routing and ECO detail routing which occur in response to an engineering change order.

The ECO global routing phase 407 and the ECO detail routing phase 409 can be much more computationally expensive than the corresponding initial global routing 401 and initial detail routing phases 403 because of the need to take account of the "existing" wires and "nets". The term "existing" refers to the detail (or global) wiring already laid out in the initial (or intermediate) design, rather than to physical wiring actually embedded in an integrated circuit. The term "net" is used to refer to a collection of related wires. Usually, an ECO will only affect certain devices and nets connecting the devices in the initial design, i.e.

a portion of the entire design. While the wiring for the entire chip does not need to recomputed, the effort in threading through the existing wiring and in determining which existing wires can or should be ripped up and replaced to accommodate the ECO wires in the changed design is very difficult.

Among the advantages of embodiments of the invention is to model existing wires more accurately during the ECO global wiring phase and to retain some of the efficiency of the global routing model. In embodiments of the invention, every track in the edges of the global tile is modelled individually. That is, the global router must choose a track for the global wires for every edge between tiles. Further, in embodiments, the global router is "penalized" when the global router switches tracks to lay a global wire. In addition, in embodiments, the global router is penalized when the global router chooses a used or existing track. Rip-up is usually very costly computationally; in preferred embodiments, a higher penalty is chosen for selecting a used track than for switching tracks.

Embodiments of the invention add the modeling of a track explicitly into the global routing model, e.g., as the wire capacity per track along an edge in the routing graph, as compared to the prior art where all of the tracks in a region are lumped together in a single quantity.

In embodiments of the invention, track switches or jogs are allowed in the global routing model. As mentioned above, global routers simplify the routing problem to gain speed, and global quality. Those simplifications in the prior art for global routing result in additional rip-up and rerouting. Jogs do not eliminate rip-up and rerouting in general: a jog on the same layer of a given wire depends on space on that layer to be legal, and jog on a different layer than the wire, requires free tracks on layers above or below, plus spaces for vias. These additional needs are not represented in the prior art, as part of the simplifications made for global routers, and therefore are inherent problems with the global routing approach.

Figure 5:
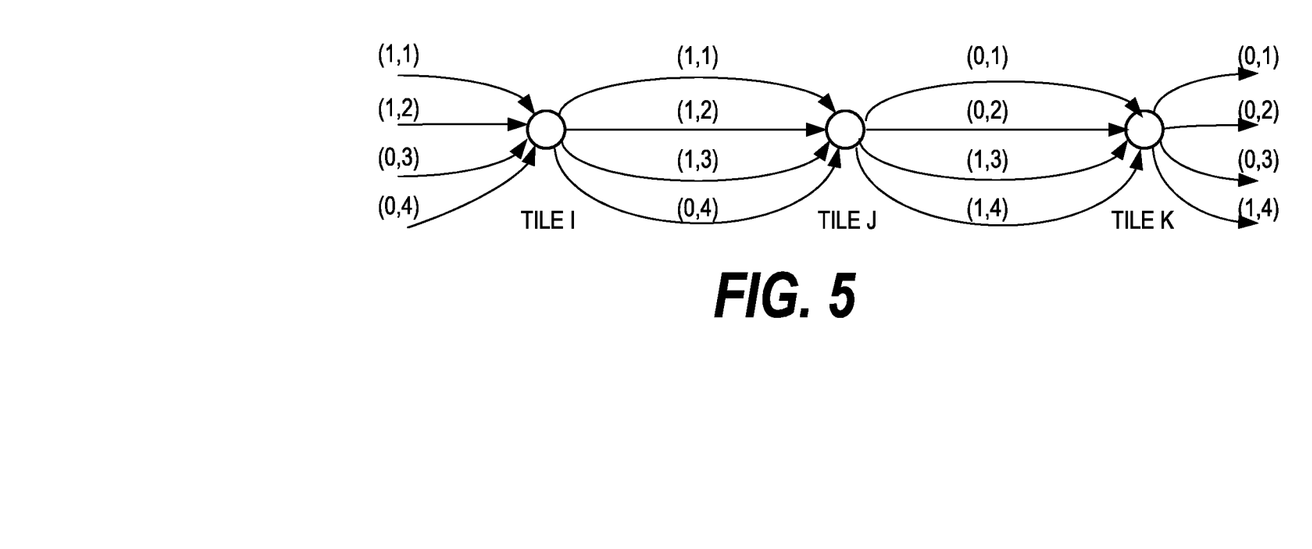
FIG. 5 is a diagram depicting the wire track model between adjacent global tiles according to a first embodiment of the invention.

FIG. 5 is a diagram depicting the wire track model between adjacent global tiles according to a first embodiment of the invention. In embodiments of the invention, each of the tracks is defined by an x, y vector defined as follows:

For vector (x, y): x indicates whether the track is used; y is the track number.

In one preferred embodiment, if the track is used, x=1, or the track is free, x=0. In other embodiments, x is set to zero or another value if a lower, priority, or non-critical wiring net is assigned to the wire track.

In the figure, wire tracks 1, 2 and 3 are used between global tile I and global tile J, while wire track 4 is free. The vector for track 1 is (1, 1) and the vector for track 2 is (1, 2).

The vector for track 3 is (1, 3) and the vector for track 4 is (0, 4). Between global tile J and global tile K, wire tracks 1 and 2 are free, while wire tracks 3 and 4 are used. So between these two tiles, the vector for track 1 is (0, 1) and the vector for track 2 is (0, 2). The vector for track 3 is (1, 3) and the vector for track 4 is (1, 4).

In embodiments of the invention, routing costs are determined for various routing characteristics. In one example, For a path going from tile I->J->K: TrackSwitchCost*|Track(I,J)−Track(J,K)|

The purpose of the equation is to add a cost (or penalty) to the global router, for switching tracks. So, suppose there are three nodes in the routing graph, I, J, and K. Also suppose that nodes I and J are connected with two tracks, Track 1 and Track 2, and that nodes J and K with another two tracks, Track 1 and Track 2. Supposing that the global router has to produce a wire that goes from I to K. If the track starts on track 1, there are two possible paths:

Path A), i.e. Track(I,J)=Track(J,K)=1 uses track 1 between I and J, and track 1 between J and K.

Path B), i.e. Track(I,J)=1 and Track(J,K)=2, uses track 1 between I and J, and track 2 between J and K.

As Path A) does not switch tracks, i.e. TrackSwitchCost*|Track(I,J)−Track(J,K)|=TrackSwitchCost*0=0, whereas Path B) does switch tracks. , i.e. TrackSwitchCost*|Track(I,J)−Track(J,K)|=TrackSwitchCost*1>0. So Path A) is preferable to Path B) for this reason, as additional wiring is required for the switching, and so the equation is used to represent a cost for this track change. The penalty is the TrackSwitchCost factor. In preferred embodiments of the invention, the TrackSwitchCost factor can vary depending on the level of metal being wired by the global router.

The global routing model of the present invention has advantages over the prior art as it more accurately models specific track usage. Because of the more accurate track modeling, it can cause rip-up and reroute to be more efficient. Supposing that there are two possible routings of two nets:

Routing A) net1 uses track 1 from I to K, and net2 uses track 2 from I to K;

Routing B) net1 uses track 1 from I to J, and track 2 from J to K, and net2 uses track 2 from I to J and track 1 from J to K.

Both routings are acceptable global routings, but have different detail routing consequences. For Routing A), the detail routing is complete and clean, because there is no track switching for any net, and therefore, there is a completed wire from tile I to tile K. For Routing B), there is a track switch for two nets at node J. Physically speaking, this track switch results in a short (a crossing between two wires of different nets on the same layer). Therefore, to compete that routing, the detail router needs to resort to jogs, which cross into other layers. Thus, eliminating track switching can simplify rip up and reroute during the detail routing phase.

In this way, the long rip-up and reroute runtime in the detail routing phase can be saved. Aside from eliminating the complexity, and the steps involved in detail routing, the actual process of detail routing is much slower computationally than the global routing process. Thus, the combination of fewer steps, during a slower part of the routing process, results in a reduced overall runtime.

Figure 6:
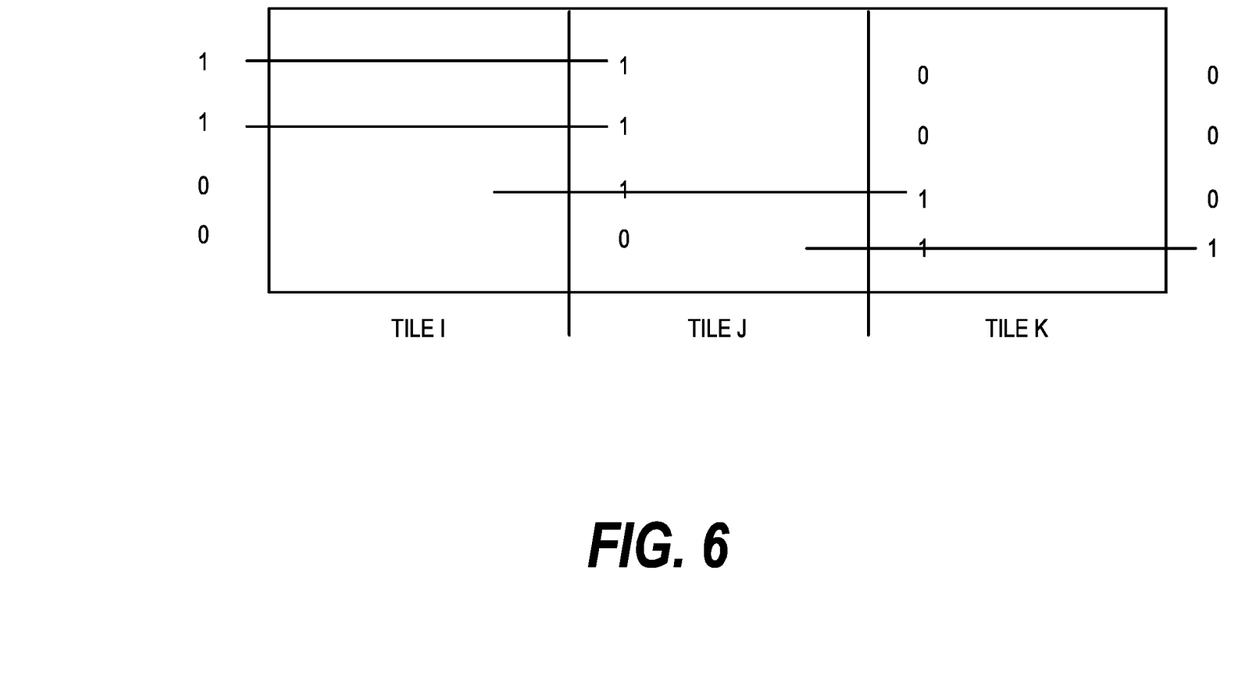
FIG. 6 is a diagram depicting the wire track model between adjacent global tiles according to a second embodiment of the invention.

FIG. 6 is a diagram depicting the wire track model between adjacent global tiles according to a second embodiment of the invention. The wire tracks can be modelled using the global routing infrastructure. In this embodiment, the wire tracks in each edge between global tiles are modeled in pattern of bits using 1 or 0 to denote whether the tracks are used or not used. For example, in embodiments of the invention, all occupied tracks are modeled with 1 and free tracks with 0. So a vector representing the wire tracks comprising the edge between global tile I and global tile J is (1, 1, 1, 0) and the vector representing the wire tracks between global tile J and global tile K is (0, 0, 1, 1).

In alternative embodiments, other values are used to denote non-critical wire tracks. For example, suppose that the wire track bridging global tiles I, J and K on track 3 belonged to a critical wire net, while the wire track bridging global tiles J and K on track 4 belonged to a non-critical wire net, the vector representing the wire tracks between global tile J and global tile K is (0, 0, 1, 2) where 2 is used to designate a non-critical wire tracks.

In some embodiments, all layers of the metal are modelled. In preferred embodiments, however, the lower metal layers (M1, M2) which are generally used only for pin access are exempt from this modeling.

Figure 7:
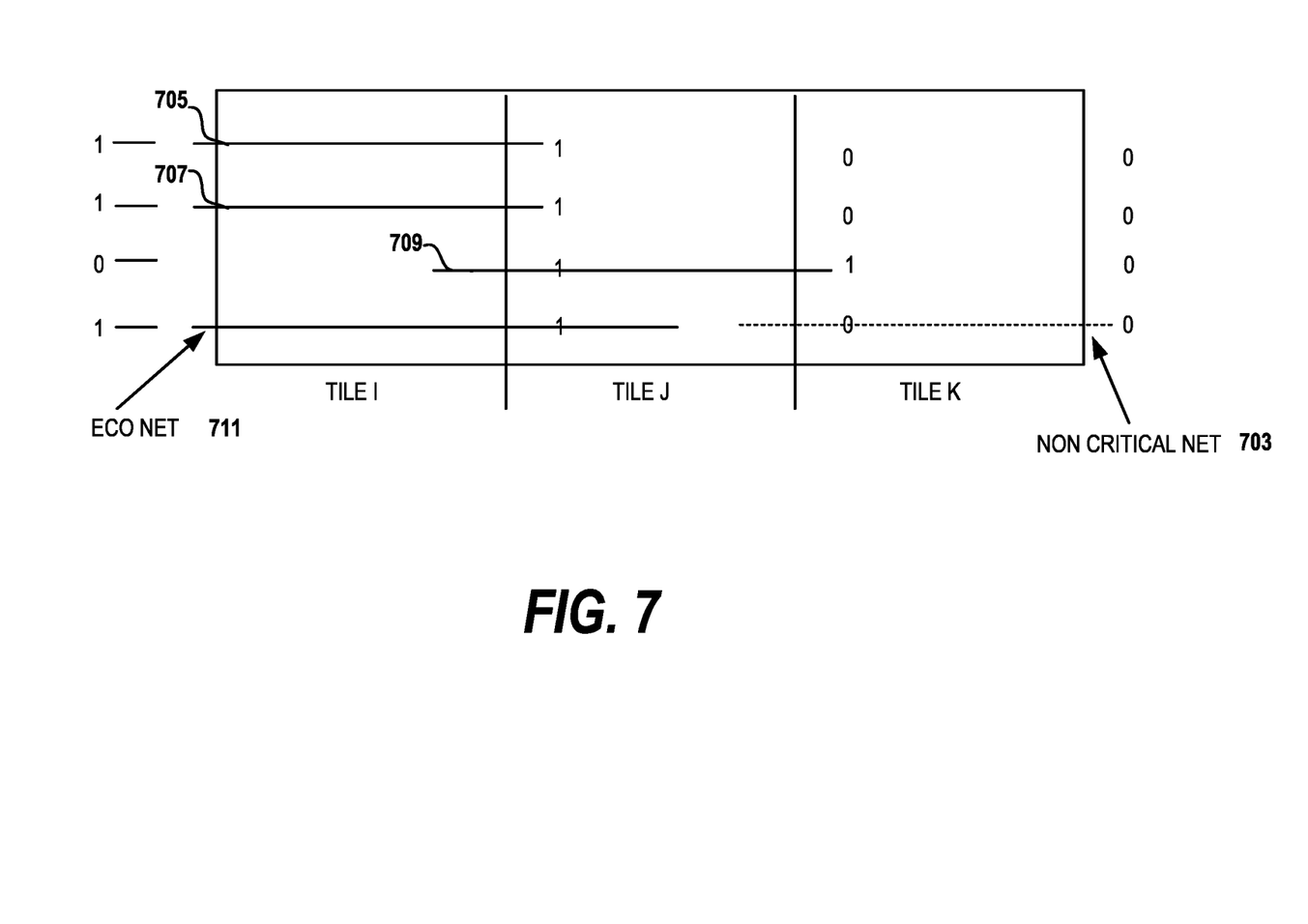
FIG. 7 is a diagram depicting the modelling and rip-up of a bystander net in favor of an ECO net.

FIG. 7 is a diagram depicting the modelling and rip-up of a bystander net in favor of an ECO net. In embodiments of the invention, the criticality of the new wire net, i.e. the ECO net, is determined in comparison with the bystander nets which have been created in a prior detail routing step. In other embodiments of the invention, only the criticality of the bystander nets are determined. As shown, a set of existing wires is modelled according to their criticality. The wire in track 4 703 is determined to be part of a non-critical net, while the wires in tracks 1, 2 and 3 (705, 707 and 709) are critical nets. Thus, in one embodiment the track 4 wire 703 is designated with a "0" in the edge vectors while each of tracks 1, 2 and 3 is designated with a "1". Thus, when ECO net 711 needs to be placed according to the ECO, the global router decides to replace the non-critical net 703, leaving the critical nets 705, 707 and 709 intact.

In some embodiments, the timing of the ECO net and other bystander nets is modeled using an efficient timing model (e.g., Elmore delay) to establish the criticality of respective bystander nets. Depending on the pervasiveness of the engineering changes to the design, either all bystander nets or only those bystander nets which come in the path of the ECO nets are modeled with track bits. In embodiments of the invention, if a net is less critical, than other existing nets, it is modeled with a "0" bit and, if needed, it is preferentially put in a rip-up bucket as compared to more critical nets. Thus, the ECO global router and the ECO detail router know that the less critical net should be preferentially chosen for the rip-up and rerouting over the critical nets. In one embodiment, the ECO router is "timing aware". That is, criticality refers to circuit timing, and describes how sensitive circuit timing is to the changes in the wires of any one of the nets that comprise the circuit. In other embodiments of the invention, other factors are used to order the criticality of respective nets in the detailed circuit. In preferred embodiments of the invention, the ranking of nets is performed prior to the ECO routing.

In embodiments of the invention, the rip-up and rerouting of bystander nets is treated differently depending on whether the wire tracks are for global wires or detail wires. A rip-up bucket is used to contain the bystander nets which are placed in the way of an ECO net. These bystanders are either a net or a net segment. In preferred embodiments of the invention, two rip-up buckets are made, one for global wires and the other for detail wires. Detail wires are more costly to rip-up because of the greater computation required to replace them. In embodiments of the invention, the ordering of rerouting depends on the criticality of the nets. The most critical nets are routed first.

One goal of path search for new global wires is to route an ECO net in such a way which maximizes the utilization of "0" bit tracks, that is, unused or less critical tracks, and minimizes overall routing cost. In preferred embodiments of the invention, routing costs are assessed to penalize the routing of global wires having certain characteristics. Examples of routing costs which are assessed in embodiments of the invention include:

Track switching cost: Ts
Cost for choosing used (critical) track: Tu
Rip-up cost of bystanders (non-critical): Tr An equation for routing cost which is used in one embodiment of the invention is:

Total cost=sum of $ws*Ts+wu*Tu+wr*Tr$ for all nets under consideration along the new path with non-negative weights ws, wu and wr. It is a design decision when tuning the global router to find good values for these weights. For example, one could use wu>wr>ws because ripping out a segment of a used critical track is more costly than ripping out bystander nets that are not critical, and, lastly, to just change tracks.

As mentioned above, in preferred embodiments of the invention, the nets are ranked by criticality, so that if existing nets need to be ripped up, less critical nets are preferentially ripped up. Also, the ranking is used to route the more critical nets, i.e. usually the new nets, but, in some embodiments, criticality is measured in the set of nets that includes the combination of the new nets and the ripped up nets, first when performing the global routing in response to the ECO. Because of the ranking of the nets by criticality, there is less detour in the critical nets.

In a cost function used by other embodiments of the invention, net criticalities taken into account in the cost function. A net criticality "n" can be expressed in terms of timing (most important in some embodiments) or in terms of routing (segment length) which is ripped out. So, Tu and Tr are net-specific and incorporate criticality.

Total cost=sum of $ws*Ts+wu*Tu(n)+wr*Tr(n)$ for all nets n under consideration along the new path. Thus, a cost equation in preferred embodiments of the invention is a function of the criticality of the nets being ripped up, that is, a very fine grained approach which has levels or a continuum of criticality which weight the cost of ripping up respective nets.

In embodiments of the invention, it is sufficient to count occupied/free tracks at the boundary only, as jogs are allowed in the global routing model. That is, a wire track is assumed free if a wire can be put in that wire track using a jog.

Figure 8:
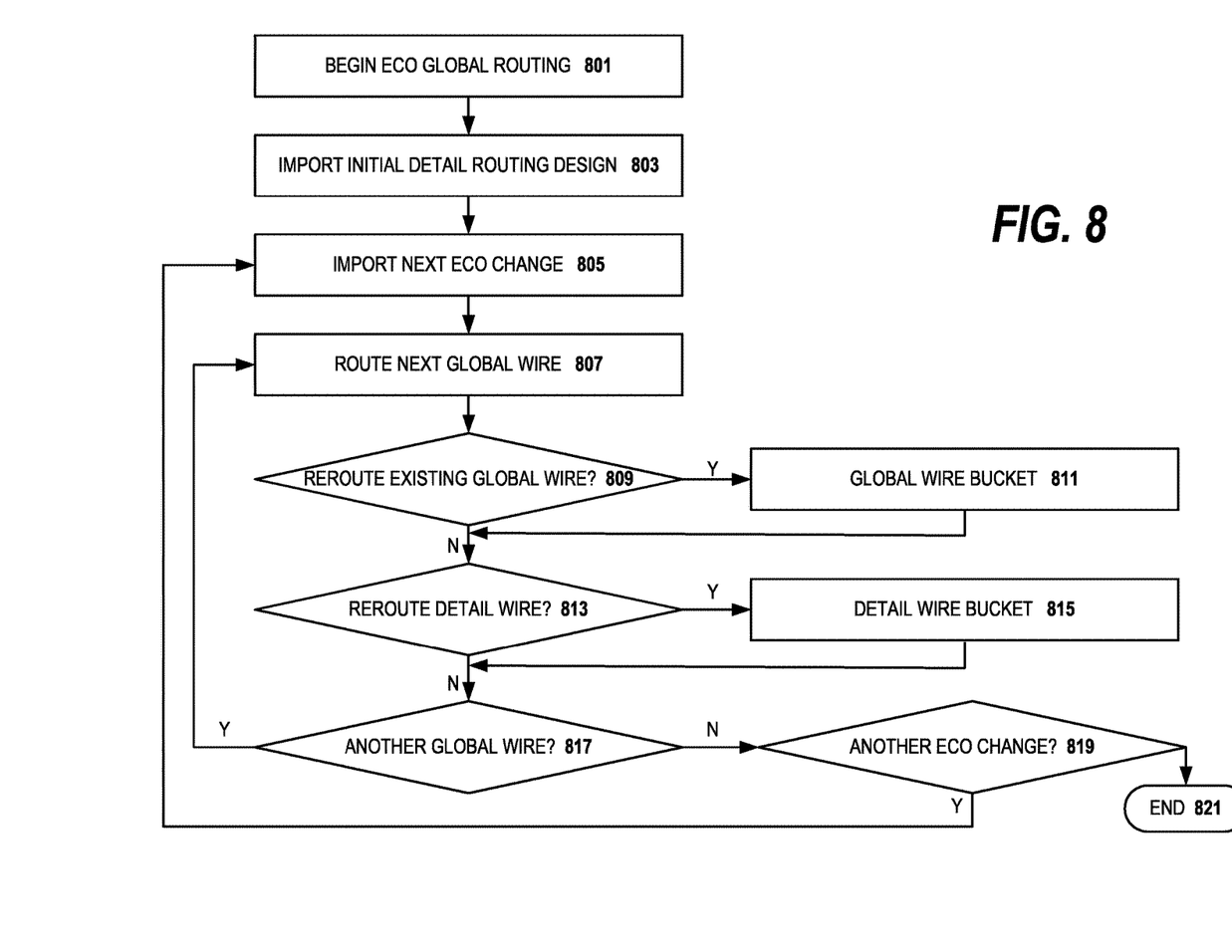
FIG. 8 is a flow diagram illustrating a method for performing routing according to some embodiments of the invention.

FIG. 8 is a flow diagram illustrating a method for an ECO routing process according to a preferred embodiment of the invention. In step 801, the ECO routing process begins. First, in step 803, the initial detail routing design or topology is imported. The design contains, for example, the initial design of a semiconductor chip according to an initial global routing and initial detail routing. Next, in step 805, the next ECO change is imported. In the first pass of the process, this will be the first ECO change which will detail the changes needed to the initial detail routing for a particular portion of the integrated circuit. Typically, in an ECO, the logic has changed or a book has been powered up/down or moved. More generally, any non-footprint compatible change of the placement of the wiring nets has occurred. Sometimes, an ECO occurs if a net is being rerouted with new wire characteristics (e.g., a new layer assignment, new wire width).

In step 807, the next global wire is routed taking into account the existing wires from the initial design. As described above, the global routing of the present invention assigns each global wire to a specific one of the wire tracks present at each edge of the set of global tiles in the portion of the integrated circuit which needs to be changed because of the ECO. In this phase, the global router will attempt to place the global wire without using an existing, used wire track from the initial design. Further, in embodiments of the invention, if an existing, used wire track must be used due to the lack of wire capacity in a particular edge between nodes, the global router will preferentially select a non-critical net to rip-up in preference to a critical net. The placement of the global wire will also attempt to minimize track switches. Furthermore, global wires will be ripped up in preference to detail wires as the global wires have a lower computational cost to replace. As part of the placement of the global wire, the track placement is tracked to reduce the number of track switches. As mentioned above, reducing the number of track switches will reduce the amount of computation needed in a subsequent detail routing process. In a preferred embodiment, the global wires are ordered, either in this step or in a prior step, according to the criticality of the respective global wires so that the more critical wires or nets can be routed first. Because the more critical nets are routed first, there will be fewer track switches in the more critical nets as compared to the less critical nets.

In step 809, the global router determines whether a global wire or net needed to be ripped up. In the first pass for routing the first global wire, this will not occur, but as global wires are laid down and new global wires added, it is a possibility as the routing of the circuit becomes more complex. If so, the existing global wire will be placed in the global wire rip-up bucket in step 811. The wires in the global wire rip-up bucket will be added to the wires which need to be routed because of the ECO change. In step 813, the global router determines whether a detail wire or net needed to be ripped up, e.g., from the initial design. If so, the existing detail wire will be placed in the detail wire rip-up bucket in step 815. The wires in the detail wire rip-up bucket will be added to the wires which need to be placed in the subsequent detail routing. In preferred embodiments of the invention, the wires or nets in the detail wire rip-up bucket are ordered according to their criticality so that the more critical wires or nets can be routed first by the detail router. As above for the global wires, this will have the effect of allowing the critical detail wires to have fewer track switches than less critical detail wires.

In step 817, a test is performed to determine whether there is another global wire associated with the current ECO change. For example, if there is another global wire associated with the ECO or a global wire is in the rip-up bucket. If so, the process returns to step 807 to complete routing of the global wires. If not, a test in step 819 is performed to determine whether there is another ECO change which needs to be handled by the global router. If so, the process returns to step 805. If not, the process ends in step 821 by passing the ECO global routing to the ECO detail routing phase.

In this flow chart, global routing is done sequentially which is not necessarily the case in alternative embodiments. If more than one net is ECO routed, the global routing problem may be executed at once (using conventional global routing methods). After global routing is completed, the detail router kicks in and turns the global routing guidance in printable detail wires for the portions of the integrated circuit affected by the ECO changes. The detail router completes each global track assignment as a set of detail wires for an integrated circuit structure. The set of detail wires may include one or more detail wires for the integrated circuit.

Figure 9:
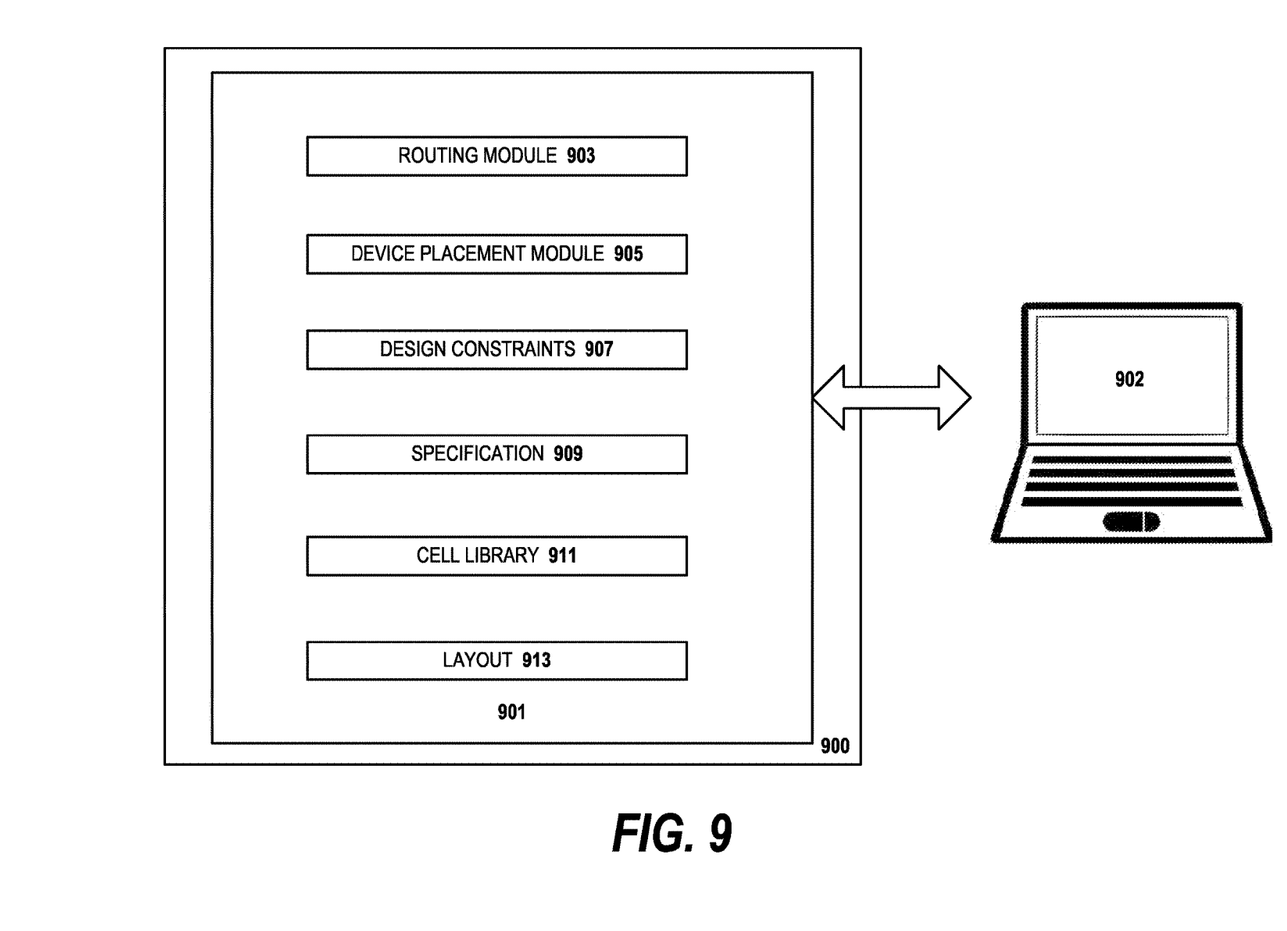
FIG. 9 is a diagram which a general architecture of an EDA system to perform global routing according to some embodiments of the invention.

FIG. 9 is a diagram which a general architecture for using a system to perform routing according to some embodiments of the invention. EDA tool 900 includes a computer memory 901 which includes a plurality of logic and data modules. A user interacts with the EDA tool using a user terminal 902 such as personal computer or workstation. A routing module 903 is used to route an electronic design to generate a layout 913. The routing module 903 uses one or more design specifications 909 and one or more design constraints 907 to generate the layout. A device placement module 905 is used to place the devices in the integrated circuit. The design constraints 907 may include one or more constraints that are imposed to guarantee the ability to generate mask designs that are capable of manufacturing the routed layout 913. One or more cell libraries 911 may contribute cells that are routed by wires in the layout 913. One or more users may operate EDA tool 900 using one or more user terminals 902. The one or more user terminals 902 may include a display device for displaying visual information during the operation of EDA tool 900 or to display the results of operating the EDA tool, e.g., to display layout 913.

Figure 10:
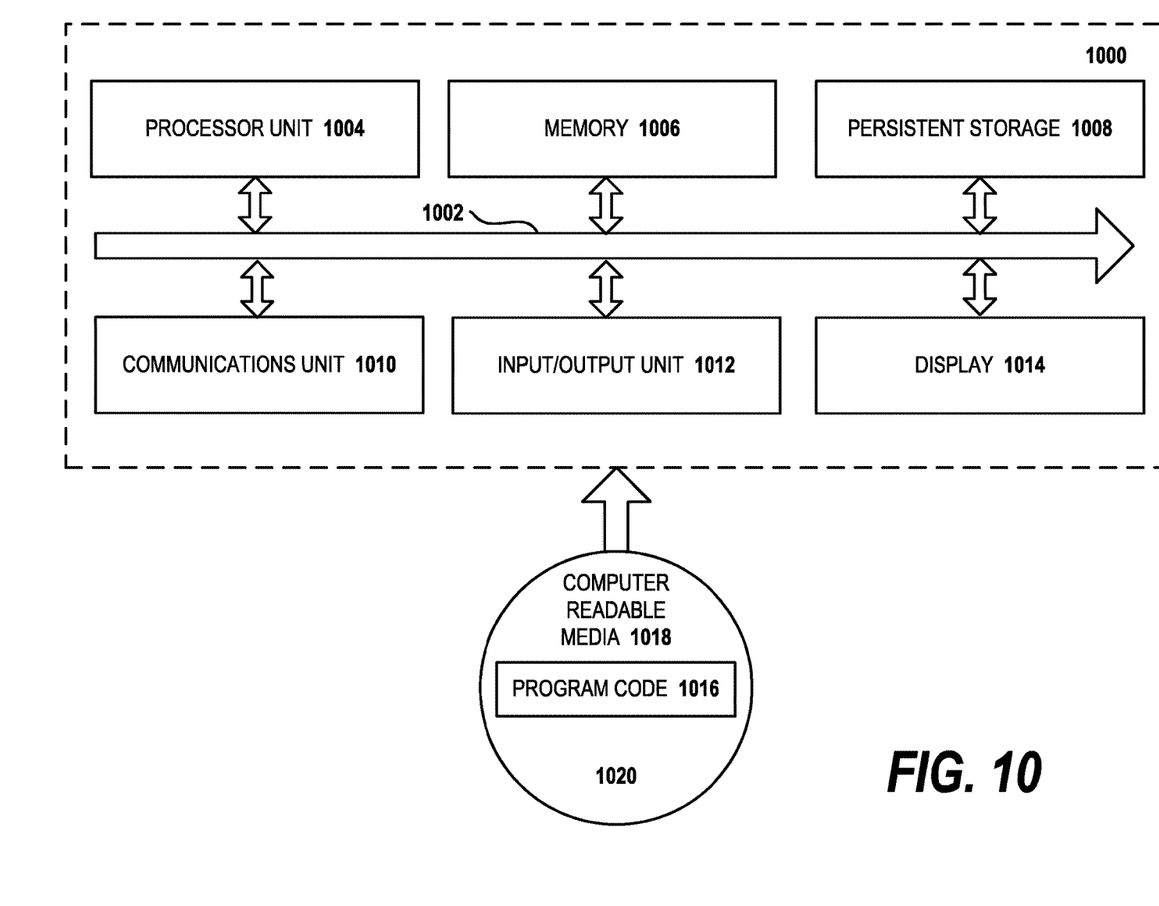
FIG. 10 is an exemplary block diagram of a data processing system in which exemplary aspects of the illustrative embodiments may be implemented.

With reference now to FIG. 10, a block diagram of an exemplary data processing system is shown in which aspects of the illustrative embodiments may be implemented. Data processing system 1000 is an example of a computer, such as user terminal 902 or EDA tool 900 in FIG. 9, in which computer usable code or instructions implementing the processes for illustrative embodiments of the disclosure may be located.

With reference now to FIG. 10, a block diagram of a data processing system is shown in which illustrative embodiments may be implemented. Data processing system 1000 is an example of a computer in which computer-usable program code or instructions implementing the processes may be located for the illustrative embodiments. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a set of one or more processors or may be a multi-processor core, depending on the particular implementation. Further, processor unit 1004 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 1006 and persistent storage 1008 are examples of storage devices. A storage device is any piece of hardware that is capable of storing information either on a temporary basis and/or a permanent basis. Memory 1006, in these examples, may be, for example, a random access memory or any other suitable volatile or non-volatile storage device. Persistent storage 1008 may take various forms depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard and mouse. Further, input/output unit 1012 may send output to a printer. Display 1014 provides a mechanism to display information to a user.

Instructions for the operating system and applications or programs are located on persistent storage 1008. These instructions may be loaded into memory 1006 for execution by processor unit 1004. The processes of the different embodiments may be performed by processor unit 1004 using computer implemented instructions, which may be located in a memory, such as memory 1006. These instructions are referred to as program code, computer-usable program code, or computer-readable program code that may be read and executed by a processor in processor unit 1004. The program code in the different embodiments may be embodied on different physical or tangible computer-readable media, such as memory 1006 or persistent storage 1008.

Program code 1016 is located in a functional form on computer-readable media 1018 that is selectively removable and may be loaded onto or transferred to data processing system 1000 for execution by processor unit 1004. Program code 1016 and computer-readable media 1018 form computer program product 1020 in these examples. In one example, computer-readable media 1018 may be in a tangible form, such as, for example, an optical or magnetic disc that is inserted or placed into a drive or other device that is part of persistent storage 1008 for transfer onto a storage device, such as a hard drive that is part of persistent storage 1008. In a tangible form, computer-readable media 1018 also may take the form of a persistent storage, such as a hard drive, a thumb drive, or a flash memory that is connected to data processing system 1000. The tangible form of computer-readable media 1018 is also referred to as computer-recordable storage media. In some instances, computer-recordable media 1018 may not be removable.

Alternatively, program code 1016 may be transferred to data processing system 1000 from computer-readable media 1018 through a communications link to communications unit 1010 and/or through a connection to input/output unit 1012. The communications link and/or the connection may be physical or wireless in the illustrative examples. The computer-readable media also may take the form of non-tangible media, such as communications links or wireless transmissions containing the program code. The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. As one example, a storage device in data processing system 1000 is any hardware apparatus that may store data. Memory 1006, persistent storage 1008, and computer-readable media 1018 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006 or a cache such as found in an interface and memory controller hub that may be present in communications fabric 1002.

The present invention has many advantages over the prior art. Among the ECO aware global routing model's strength is that it more accurately models specific track usage. Embodiments can drive rip-up and reroute, because of the more precise track modeling. No extra track assignment step required. Some router solutions use track assignment which is an intermediate step b/w global routing and detail routing. In that step, wire segments are assigned to detail tracks (according to global routing guidance) whose loose ends are finally connected by a detail router, often using a switchbox routing algorithm. Long rip-up and reroute runtime in detail routing can be saved. Because of the ranking of the nets by criticality, there is less detour in the critical nets.

Some of the additional advantages of the invention include low cost and better quality ECO routing, low cost ripup and reroute strategy, ECO aware global routing and better bystander selection. As compared to prior art routers, the present invention offers better quality of routing, savings in design time, improved productivity and costs.

The global and detail routing are part of the physical design of the integrated circuit. Once the positions of the wires and nets have been established in the routing process, post wiring optimizations for timing, noise and yield are performed. The final design is checked to make sure that the mapping to the logic design was performed correctly and that the particular manufacturing rules for the process intended to make the integrated circuit were followed. Tapeout and mask generation follow where the wiring design is turned into photomasks in a mask data preparation process.

The resulting design can be included within integrated circuit chips, which can be distributed by the fabricator in wafer form (that is, as a single wafer that has multiple chips), as a bare die, or in a packaged form. In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While only one or a limited number of features are illustrated in the drawings, those ordinarily skilled in the art would understand that many different types of features could be simultaneously formed with the embodiment herein and the drawings are intended to show simultaneous formation of multiple different types of features. However, the drawings have been simplified to only show a limited number of features for clarity and to allow the reader to more easily recognize the different features illustrated. This is not intended to limit the invention because, as would be understood by those ordinarily skilled in the art, the invention is applicable to structures that include many of each type of feature shown in the drawings.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having described our invention, what we now claim is as follows:

1. A computer implemented method for using a router to produce a first integrated circuit structure according to an engineering change order comprising:
    using a computer system having at least one processor to perform a process, the process comprising:
    importing an initial detail routing topology for the first integrated circuit structure;
    receiving an engineering change order instructing the router to change a portion of the initial detail routing topology for the first integrated circuit structure;
    responsive to the engineering change in the initial detail routing topology, performing a global routing operation which routes global wires for the portion of the initial detail routing topology for the first integrated circuit structure, wherein, for each global wire routed, a specific global wiring track is selected for the global wire within each edge of a set of global tiles in a routing topology for the first integrated circuit; and
    using a detail router for completing each global track assignment as a set of detail wires for fabrication of the first integrated circuit structure.

2. The method as recited in claim 1, further comprising determining a cost for global routing, wherein, for each global wire routed, a cost is determined and using a wiring track which is already used in the routing topology is penalized in the cost determination; and
    causing the first integrated circuit structure to be fabricated using the completed set of detail wires.

3. The method as recited in claim 1, further comprising determining a cost for global routing, wherein, for each global wire routed, a cost is determined and using a wiring track which is used in the initial routing topology is penalized according to a criticality of a respective net using the wiring track in the cost determination.

4. The method as recited in claim 1, further comprising determining a cost for global routing, wherein, for each global wire routed, a cost is determined and switching between wiring tracks is penalized in the cost determination.

5. The method as recited in claim 1, further comprising determining an aggregate cost for global routing for the engineering change order, wherein the global wires are routed to minimize the aggregate cost, wherein routing on a used wire track and switching between wiring tracks is penalized in the aggregate cost determination.

6. The method as recited in claim 5, wherein the aggregate costs are determined according to a weighted algorithm which uses a higher weight for a cost of routing on a used track than a weight for a cost of switching tracks.

7. The method as recited in claim 1, further comprising selecting specific global wiring tracks to maximize use of unused wiring tracks.

8. The method as recited in claim 1, further comprising:
    ordering a set of global wiring nets according to criticality; and
    routing the set of global wiring nets in the global routing operation in order of criticality.

9. The method as recited in claim 1, further comprising:
    ordering a set of wiring nets according to criticality, wherein the set of wiring nets comprise a set of nets existing in the portion of the initial detail routing topology for the first integrated circuit structure; and
    preferentially selecting wiring nets of a lower criticality for rip up if needed to route global wires according to the engineering change order.

10. The method as recited in claim 1, further comprising:
    routing a first global wire in a specific wiring track which is used by an existing global wire;
    placing the existing global wire in a global wire rip up bucket;
    routing a second global wire in a specific wiring track which is used by an existing detail wire; and
    placing the existing detail wire in a detail wire rip up bucket.

11. A computer readable memory storing a control program for controlling an automatic routing according to an engineering change order in a first integrated circuit, said control program comprising instructions to cause a computer system having at least one processor to perform the process of:
    importing an initial detail routing topology for the first integrated circuit structure;
    receiving an engineering change order instructing the router to change a portion of the initial detail routing topology for the first integrated circuit structure; and responsive to the engineering change in the initial detail routing topology, performing a global routing operation which routes global wires for the portion of the initial detail routing topology for the first integrated circuit structure, wherein, for each global wire routed, a specific global wiring track is selected for the global wire within each edge of a set of global tiles in a routing topology for the first integrated circuit; and using a detail router for completing each global track assignment as a set of detail wires for fabrication of the first integrated circuit structure.

12. The computer readable memory as recited in claim 11, further comprising determining a cost for global routing, wherein, for each global wire routed, a cost is determined and using a wiring track which is already used in the routing topology is penalized in the cost determination.

13. The computer readable memory as recited in claim 11, further comprising determining an aggregate cost for global routing for the engineering change order, wherein the global wires are routed to minimize the aggregate cost, wherein routing on a used wire track and switching between wiring tracks is penalized in the aggregate cost determination.

14. The computer readable memory as recited in claim 11, further comprising selecting specific global wiring tracks to maximize use of unused wiring tracks.

15. The computer readable memory as recited in claim 11, further comprising:
ordering a set of global wiring nets according to criticality; and
routing the set of global wiring nets in the global routing operation in order of criticality.

16. The computer readable memory as recited in claim 11, further comprising:
ordering a set of wiring nets according to criticality, wherein the set of wiring nets comprise a set of nets existing in the portion of the initial detail routing topology for the first integrated circuit structure; and
preferentially selecting wiring nets of a lower criticality for rip up if needed to route global wires according to the engineering change order.

17. The computer readable memory as recited in claim 11, further comprising:
routing a first global wire in a specific wiring track which is used by an existing global wire;
placing the existing global wire in a global wire rip up bucket;
routing a second global wire in a specific wiring track which is used by an existing detail wire; and
placing the existing detail wire in a detail wire rip up bucket.

18. Apparatus, comprising:
a processor;
a computer memory holding computer program instructions executed by the processor for controlling an automatic routing according to an engineering change order in a first integrated circuit, the computer program instructions when executed carrying out the actions comprising:
importing an initial detail routing topology for the first integrated circuit structure;
receiving an engineering change order instructing the router to change a portion of the initial detail routing topology for the first integrated circuit structure;
responsive to the engineering change in the initial detail routing topology, performing a global routing operation which routes global wires for the portion of the initial detail routing topology for the first integrated circuit structure, wherein, for each global wire routed, a specific global wiring track is selected for the global wire within each edge of a set of global tiles in a routing topology for the first integrated circuit; and
using a detail router for completing each global track assignment as a set of detail wires for fabrication of the first integrated circuit structure.

19. The apparatus as recited in claim 18, further comprising determining an aggregate cost for global routing for the engineering change order, wherein the global wires are routed to minimize the aggregate cost, wherein routing on a used wire track and switching between wiring tracks is penalized in the aggregate cost determination.

20. The apparatus as recited in claim 18, further comprising:
ordering a set of global wiring nets according to criticality; and
routing the set of global wiring nets in the global routing operation in order of criticality.

* * * * *